Patented Oct. 11, 1949

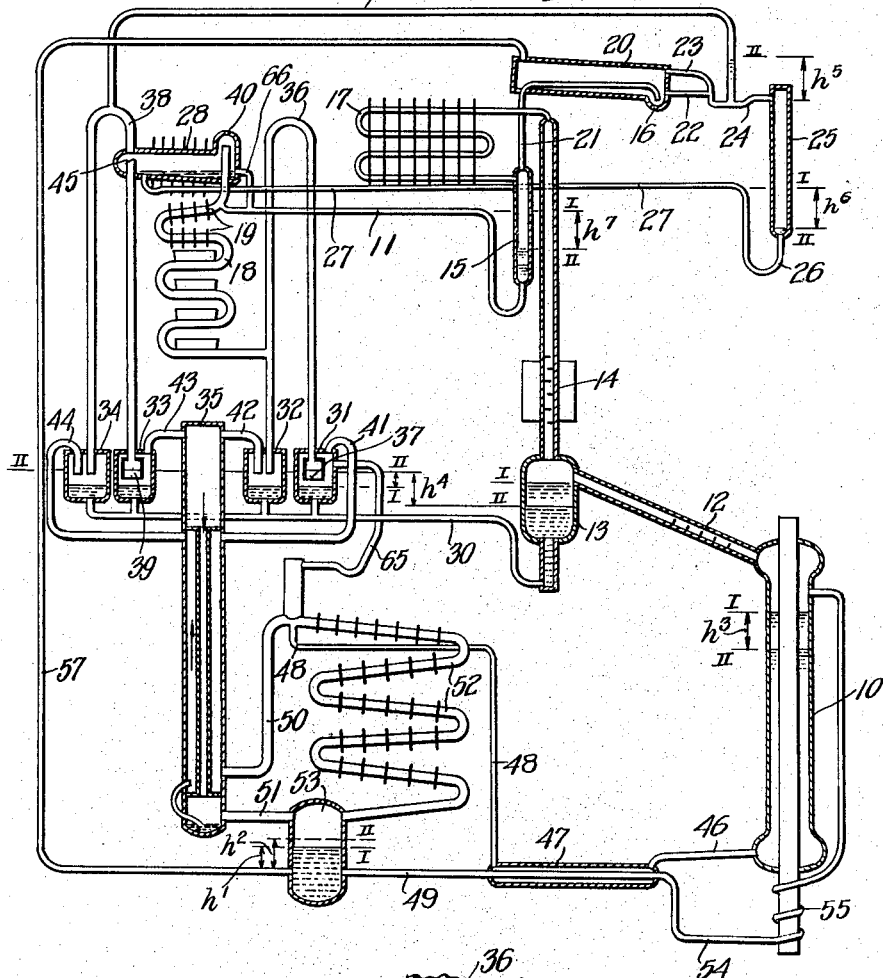
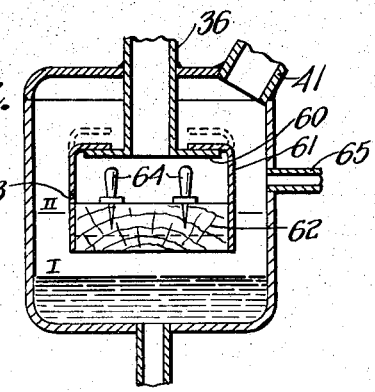

2,484,669

UNITED STATES PATENT OFFICE 2,484,669

METHOD AND DEVICE RELATING TO ABSORPTION REFRIGERATING APPARATUS

Sigurd Mattias Bäckström, Stockholm, Sweden, assignor to Aktiebolaget Elektrolux, Stockholm, Sweden, a corporation of Sweden Application April 7, 1942, Serial No. 437,998
In Sweden April 22, 1941

31 Claims. (Cl. 62—5)

The present invention relates to a method of and apparatus for regulating the cooling effect of an hermetically closed, air cooled, continuous absorption refrigerating system of the type using an inert pressure equalizing gas to maintain the same total pressure throughout the system.

The invention is characterized chiefly in that condensate produced only during abnormal working conditions is used to form liquid columns for causing a pressure differential between different parts of the apparatus and utilizing the pressure differential as an impulse or controlling force. According to the invention use is made of condensate produced in the so-called pressure vessel for building up the water columns. The invention further relates to a method and apparatus utilizing the controlling force for regulating the operation of the apparatus by controlling the flow of a fluid in the system.

The invention will become more apparent from the following description of the drawings. In the drawings:

Fig. 1 is a diagrammatical view of an absorption refrigeration system incorporating apparatus for regulating the cooling effect of the evaporator, and Fig. 2 is a sectional view of one of the valves in the apparatus for controlling the operation of the system.

In Fig. 1, 10 designates the boiler of the refrigerating apparatus and 12 the vapor conduit extending from the boiler. Said conduit 12 opens into the upper part of a leveling vessel 13 from which the vapor is led through an air cooled rectifier 14 to an air cooled condenser 17 provided with cooling fins. The condensate produced in the condenser 17 is supplied to a leveling vessel 15 from the bottom of which the refrigerant flows through a conduit 11 into the upper end of an evaporator in the form of a tubular coil. The upper section 19 of the evaporator is provided with fins for increasing the heat transfer surface and is arranged for space cooling whereas the lower section 18 is arranged for low temperature cooling.

Further, 20 designates a so-called pressure vessel which compensates for variations in the pressure of the working media caused by variations in the temperature of the ambient air. At high air temperatures, all of the refrigerant vapor will not condense in the condenser 17 and will flow through a conduit 21 into the pressure vessel 20 and displace the inert gas therein. The conduit 21 opens into a small recess 16 in the bottom of the pressure vessel 20. Two conduits 22 and 23 are connected at one of their ends to lower and upper parts of the pressure vessel 20 and the other ends of the conduits are connected to one leg of a U-tube 24. The other leg of the U-tube 24 is connected to a leveling vessel 25. The lower end of the leveling vessel 25 is connected through a U-tube 26 and conduit 27 to a reservoir 28 suitably arranged in a refrigerator cabinet above the evaporator section 19 and the reservoir is provided with fins to adapt it for space cooling.

The leveling vessel 13 is connected by a conduit 30 with four valve vessels 31, 32, 33 and 34 in the circulating system for the inert gas. The valve vessels 31 and 34 are connected by conduits 41 and 44, respectively, with the outer jacket of a gas heat exchanger 35. The valve vessels 32 and 33 are connected by conduits 42 and 43, respectively, with the inner tube of the gas heat exchanger 35. The valve vessels 31 and 32 are also connected to each other by an inverted U-tube 36, one leg of which extends into the vessel 32 on a level with the end of the tube 42 and the other leg of which extends into the vessel 31 and a float valve 37 in the vessel, as will be later more fully described, with its end positioned at a level somewhat higher than the tube end 42. The lower end of the evaporator section 18 is connected to the left leg of the U-tube 36. In a similar manner the valve vessels 33 and 34 communicate with each other through an inverted U-tube 38 and the vessel 33 is provided with a corresponding float valve 39. The right leg of the U-tube 38 is adapted to communicate with the upper end of the evaporator section 19 through the refrigerant reservoir 28. The end of the evaporator section 19, in fact, extends into a dome 40 arranged on the reservoir 28 and the reservoir 28 is connected in the right leg of the U-tube 38 in such manner that the tube end 45 is located above the level of any liquid refrigerant in chamber 28 but below the end of the coil of evaporator section 19 in the dome.

The lower part of the gas heat exchanger 35 is connected by conduits 50 and 51 to the absorber coil 52 and the absorber vessel 53, respectively. The inert gas separated from the refrigerant in the absorber 52 can flow into the upper end of the evaporator section 19 through the conduit 50, outer jacket of the heat exchanger 35, conduit 44 and U-tube 38, or to the lower end of the evaporator section 18 through the conduit 41 and U-tube 36. The gas rich in refrigerant is returned from the upper or lower ends of the evaporator to the absorber vessel 53 by way of the valve vessels 32 or 33 and conduits 42 or 43, respectively, and then through the inner tube of the gas heat exchanger 35. Thus, the arrangement is such that when the valves 31 and 33 are closed the inert gas flows from the absorber into the upper section of the evaporator and passes through the evaporator in a direction of flow concurrent with the liquid refrigerant.

The liquid absorbent is circulated in a manner well known in the art with the solution weak in refrigerant flowing from the boiler 10 through a conduit 46, liquid heat exchanger 47 and conduit 48 to the absorber 52, and with the absorption solution rich in refrigerant flowing from the absorber vessel 53 through conduit 49, liquid heat exchanger 47 and a conduit 54 to the thermosiphon pump 55 of the boiler.

When the apparatus is started, condensate gradually collects in the leveling vessel 13 until the liquid level rises to the level of the outlet end of the vapor tube 12. The liquid in the leveling vessel 13 flows through the conduit 30 to the valve vessels 31 to 34 which gradually fill with the liquid, the liquid level in the valve vessels rising to the same level as in the vessel 13. The arrangement is such that at a low liquid level the valves 37 and 39 are closed to provide a path of flow from the conduit 44 through the left leg of the U-tube 38 into the reservoir 28 and upper end of the evaporator section 19 and from the lower end of the evaporator section 18 through the left leg of the U-tube 36 to the conduit 42.

The refrigerant vapor from the boiler 10 flows from the vessel 13 through the rectifier 14 to the condenser 17. Assuming the temperature of the cooling air to be relatively low, the capacity of the condenser is sufficient for complete condensation of all of the refrigerant vapor. The condensate flows through the leveling vessel 15 and the conduit 11 into the upper section 19 of the evaporator arranged for space cooling purposes through which the condensate flows by gravity through both sections 19 and 18 and evaporates therein. Any unevaporated liquid refrigerant will drain from the evaporator section 18 through the left leg of the U-tube 36 to the valve vessel 32. The evaporation of liquid refrigerant in the evaporator produces a gas circulation in the same direction as the flow of refrigerant. When the concentration of refrigerant increases, the gas mixture becomes heavier and flows by way of the valve vessel 32 and the inner tube of the heat exchanger 35 into the absorber vessel 53 and thence into the absorber 52.

Under the conditions of operation assumed above, the pressure vessel 20 contains mainly inert gas, for instance hydrogen, as the condenser is able to completely condense the generator vapors. The pressure vessel 20 is in communication through the conduits 22, 23, 24 and a conduit 56 with the inverted U-pipe 38, due to which the same pressure is maintained in the generator as in the absorber and the evaporator. Assuming now that the temperature of the cooling air increases to such a degree that the condenser 17 is no longer able to condense all of the refrigerant vapor, the refrigerant vapor will then flow through the conduit 21 into the pressure vessel 20, displacing the inert gas contained therein. When the partial pressure of the refrigerant vapor in the pressure vessel 20 has risen sufficiently high, condensation gradually takes place and the recess 16 and the liquid seal in conduit 24 will fill with liquid refrigerant. The condensation of ammonia vapor in the pressure vessel will cause a liquid column $h^5$ to be produced in the conduit 56 with a corresponding pressure rise in the pressure vessel 20. Consequently, the pressure in the pressure vessel 20, as well as in the generator 10, will be higher than the pressure in the evaporator 18 and in the absorber 52 and the liquid will rise in the absorber vessel 53 from the level $h^1$ to the level $h^2$. In order to assure control over these various pressure differences, a vent conduit 57 is connected between the pressure vessel 20 and the absorber 53 at a point located below the liquid level in the latter.

The increased pressure in the generator 10 depresses the liquid level therein by an amount $h^3$, while the liquid level in the absorber 53 rises slightly to the level $h^2$. The level in the vessel 13 is also depressed with a corresponding rise of the level in the valve receptacles 31—34. On the drawing the original levels, that is to say, the level existing under normal conditions of operation, are designated by I, while the levels under the above described abnormal conditions are indicated by II. Hence, the higher pressure in the pressure vessel 20 and generator 10 also causes each of the liquid levels $h^3$, $h^4$, $h^6$ and $h^7$ to change from the level I to the level II. The immediate effect of the rise in the liquid level in the valve vessels 32 and 34 is that the passage from the conduit 44 to the U-pipe 36 or from the U-pipe 36 to the conduit 42, respectively, is closed, so that the inert gas cannot continue to pass this way and consequently no longer flows through the evaporator in parallel flow with the liquid refrigerant. The rising of the liquid level in the valve receptacles 31 and 33, however, opens another path for the inert gas through the valve receptacle 31, the U-pipe 36 and the lower end of the evaporator section 18 and from the evaporator reservoir 28 through the right leg of the U-pipe 38 and the valve receptacle 33, that is to say, a path of flow through which the gas passes in a counter-current direction to the downward flowing cooling agent.

In order to make it possible to open the valves 31 and 33, they are, according to the invention, made in the form of float valves, the construction of which is shown in Fig. 2. The ends of the U-pipes 38 and 36 are each provided with a flange or collar 60 from which a valve body 61 is suspended. In the embodiment shown each valve body 61 consists of a cylinder in the upper end of which an opening is made having a diameter slightly larger than the diameter of the pipe 38 or 36, respectively. The bottom of the cylinder 61 is formed of a plate 62 preferably made of wood. The cylinder 61 may suitably be provided with a drain opening 63. The float is so dimensioned that the buoyancy is sufficient to raise the float upon a rise in the liquid level and in this manner open a path of flow for the gas. This open position is indicated in the drawing by dotted lines in Fig. 2. To prevent the float from rising too high, pawls 64 are provided. Otherwise the rise of the liquid level is limited by a drain conduit 65 (Fig. 1), preferably provided with a liquid seal, and connected to one of the connected valve receptacles and through which conduit any excess liquid is drained into the absorber.

The reversal of the direction of the circulating gas is quite complicated especially at the beginning of the reversing cycle. After the valves 34 and 32 have been closed the hydrogen enriched by refrigerant vapor cannot flow downwardly through the left leg of the U-tube 36 but instead the gas, after passing through the evaporator, will rise therein. Before the enriched gas reaches the highest point in the U-tube 36 the column of gas therein will over-balance the column of gas in the evaporator 18, 19 to cause the gas to reverse its direction of flow and enter the reservoir or upper evaporator vessel 28. The enriched gas then will enter the overflow 45 and flow downwardly through the right leg of the U-tube 38. This reversal is further facilitated by liquid refrigerant flowing from the pressure vessel 20 through the conduit 27 into the upper evaporator vessel or reservoir 28 to enrich the hydrogen with refrigerant vapor whereby to increase its density and promote a flow downwardly through the right leg of the U-tube 38.

The heavy ammonia enriched gas seeks its outlet at the pipe end 45 before it reaches the outlet of the pipe in the dome 40. The enriched gas in the right arm of the U-pipe 38 consequently becomes so heavy that the circulation starts and gas flows down to vessel 33 and through conduit 43, heat exchanger 35 and conduit 51 to the absorber and from there through conduit 50, heat exchanger 35, conduit 41 and U-pipe 36 to the lower part of the evaporator section 18. The ammonia which is not evaporated in the reservoir 28 is led through the conduit 66 to the evaporator 18, 19.

When the temperature of the cooling air again drops, that is to say, when more favorable operating conditions occur, the condenser 17 gradually condenses the refrigerant vapor and creates a certain suction action which results in an emptying of the condensate in the conduit 56 and breaking the liquid seal 24, the contents thereof being sucked into the recess 16 and the conduit 21. When this occurs different gas spaces in the system are no longer completely separated as is the case when the liquid column is produced in the conduit 56. The normal vent paths are opened in this way so that pressure equalization in the apparatus again becomes normal which, in turn, gradually lowers the liquid levels to the position indicated by I. The valves 31 and 33 are thereby closed and the valves 32 and 34 opened. By this method of regulating the temperature and temperature distribution in the evaporator of the refrigerator, the same cooling apparatus can easily be adjusted to varying loads and varying cooling air temperatures. It has been proven that at a high cooling air temperature counter-current flow of the gas and the liquid refrigerant in the evaporator brings about the best results, while at a low cooling air temperature counter-current flow brings about too low a temperature in the cooling box. At the same time the ice freezing capacity of the evaporator may become insufficient, due to the fact that with counter-current flow the essential evaporation takes place in the upper section of the evaporator so that the quantity of ammonia is not sufficient for an evaporation in the lowermost parts of the evaporator coil.

In view of the foregoing, it will now be understood that the arrangement according to Fig. 1 operates to a certain extent as a thermostat. As a matter of fact, the condenser 17 operates not only as the condenser of the apparatus but also as a feeling member under the action of which variations in the cooling air temperature are converted to impulses for the valves 31—34. The pressure vessel 20 acts in the same manner upon increase in load resulting from increase in temperature of cooling air. It is obviously of great advantage to be able to use the elements of the refrigeration system for transmitting impulses and to use an operating medium of the apparatus as a transmitting agent for these impulses.

It will be evident from the above description that refrigerant vapor in liquid phase is collected in the recess 16 of the pressure vessel 20 and in the liquid seal 24 upon increase in load. As previously explained, the condensation of refrigerant vapor in the pressure vessel 20 causes the liquid column $h^5$ to be produced in the conduit 56. This in turn causes liquid columns to form in the system whereby the pressure in the pressure vessel 20 and generator 10 will be higher than the pressure in the evaporator 18 and absorber 52.

In accordance with the principles of the invention, therefore, the condensate collected in the recess 16 and liquid seal 24 is utilized to produce liquid columns in the system which will build up a pressure differential between the gas spaces of different parts. Moreover, such pressure differential is utilized to modify the behavior of a fluid in the system. This is accomplished in the illustrated embodiment of the invention by employing the liquid columns built up in vessels 31, 32, 33 and 34 to change the direction of flow of inert gas through the evaporator 18.

Although a single embodiment of the invention has been shown and described, it will be apparent to those skilled in the art that various modifications and changes may be made without departing from the true spirit and scope of the invention, as pointed out in the following claims.

I claim:

1. The method of controlling the temperature distribution in the cooling element of an absorption refrigeration system using an auxiliary pressure equalizing medium which comprises separating refrigerant vapor from an absorbent, liquefying the refrigerant vapor, flowing the liquid refrigerant in a predetermined path through the cooling element, flowing the auxiliary pressure equalizing medium through the cooling element in one direction to cause the refrigerant to evaporate at a relatively low temperature, absorbing the refrigerant vapor in the absorbent to separate the pressure equalizing medium therefrom, and reversing the direction of flow of the auxiliary pressure equalizing medium through the cooling element in accordance with a change in the temperature of the ambient air.

2. The method of controlling the temperature distribution in the cooling element of an absorption refrigeration system using an auxiliary pressure equalizing medium which comprises separating refrigerant vapor from an absorbent, liquefying the refrigerant vapor, flowing the liquid refrigerant in a predetermined path through the cooling element, flowing the auxiliary pressure equalizing medium through the cooling element in one direction to cause the refrigerant to evaporate at a relatively low temperature, absorbing the refrigerant vapor in the absorbent to separate the pressure equalizing medium therefrom, and reversing the direction of flow of the auxiliary pressure equalizing medium through the cooling element in accordance with a change in the load.

3. The method of controlling the temperature distribution in the cooling element of an absorption refrigeration system using an auxiliary pressure equalizing medium which comprises separating refrigerant vapor from an absorbent, liquefying the refrigerant vapor, flowing the liquid refrigerant in a predetermined path through the cooling element, flowing the auxiliary pressure equalizing medium through the cooling element in one direction to cause the refrigerant to evaporate at a relatively low temperature, absorbing the refrigerant vapor in the absorbent to separate the pressure equalizing medium therefrom, and reversing the direction of flow of the auxiliary pressure equalizing medium through the cooling element in accordance with a change in the pressure in the system.

4. The method of controlling the temperature distribution in the cooling element of an absorption refrigeration system using an auxiliary pressure equalizing medium which comprises separating refrigerant vapor from an absorbent, liquefying the refrigerant vapor, flowing the liquid refrigerant in a predetermined path through the cooling element, flowing the auxiliary pressure equalizing medium through the cooling element in a direction concurrent with the liquid refrigerant, absorbing the refrigerant vapor in the absorbent to separate the pressure equalizing medium therefrom, and reversing the direction of flow of the auxiliary pressure equalizing medium through the cooling element in response to a predetermined change in the temperature of the ambient air to cause the medium to flow in a direction countercurrent to the liquid refrigerant.

5. The method of controlling the temperature distribution in the cooling element of an absorption refrigeration system using an auxiliary pressure equalizing medium which comprises separating refrigerant vapor from an absorbent, liquefying the refrigerant vapor, flowing the liquid refrigerant in a predetermined path through the cooling element, flowing auxiliary pressure equalizing medium in a first path of flow concurrent with the liquid refrigerant in the cooling element and also in a second path of flow countercurrent to the liquid refrigerant, evaporating the liquid refrigerant in the presence of the auxiliary pressure equalizing medium to cause the refrigerant to evaporate at a relatively low temperature, absorbing the refrigerant vapor in the absorbent to separate the pressure equalizing medium therefrom, and shifting the flow of the auxiliary pressure equalizing medium from one to the other of its separate paths of flow in response to changes in pressure in the system.

6. The method of controlling the temperature distribution in the cooling element of an absorption refrigeration system using an auxiliary pressure equalizing medium which comprises separating refrigerant vapor from an absorbent, condensing the refrigerant vapor by transferring heat to the ambient air, flowing the liquid refrigerant in a predetermined path through the cooling element, flowing the auxiliary pressure equalizing medium through the cooling element in one direction to cause the refrigerant to evaporate at a relatively low temperature, absorbing the refrigerant vapor in the absorbent to separate the pressure equalizing medium therefrom, and reversing the direction of flow of the pressure equalizing medium in response to a predetermined increase in the temperature of the ambient air.

7. The method of controlling the temperature distribution in the cooling element of an absorption refrigeration system using an auxiliary pressure equalizing medium which comprises separating refrigerant vapor from an absorbent, condensing the refrigerant vapor at one place by transferring heat to the ambient air, flowing condensed liquid refrigerant in a predetermined path through the cooling element, flowing the auxiliary pressure equalizing medium through the cooling element in one direction to cause the refrigerant to evaporate at a relatively low temperature, absorbing the refrigerant vapor in the absorbent to separate the pressure equalizing medium therefrom, condensing the refrigerant vapor at another place upon an abnormal increase in temperature of the ambient air, utilizing the condensate formed at the second place to form a liquid column for producing a pressure differential in the system, and utilizing the pressure differential in the system to reverse the direction of flow of the auxiliary pressure equalizing medium through the cooling element.

8. The method of controlling the temperature distribution in the cooling element of an absorption refrigeration system using an auxiliary pressure equalizing medium which comprises separating refrigerant vapor from an absorbent, condensing the refrigerant vapor at one place during normal operation, flowing condensed refrigerant in a predetermined path through the cooling element, flowing the auxiliary pressure equalizing medium through the cooling element in a direction concurrent with the liquid refrigerant, evaporating the liquid refrigerant in the presence of the pressure equalizing medium, absorbing the refrigerant vapor in the absorbent to separate the pressure equalizing medium therefrom, condensing the refrigerant vapor at another place upon an abnormal increase in temperature of the ambient air, utilizing the condensate formed at the second place to form a liquid column for producing a pressure differential in the system, and utilizing the pressure differential in the system to reverse the direction of flow of the pressure equalizing medium through the cooling element to cause it to flow in a direction countercurrent to the refrigerant.

9. In an absorption refrigeration system comprising a plurality of elements including an evaporator interconnected to provide a closed circuit for the circulation of a refrigerant, an absorbent, and an auxiliary pressure equalizing medium, and mechanism in the circuit responsive to changes in the temperature of the ambient air for reversing the direction of flow of the pressure equalizing medium through the evaporator.

10. In an absorption refrigeration system comprising a plurality of elements including an evaporator interconnected to provide a closed circuit for the circulation of a refrigerant, an absorbent, and an auxiliary pressure equalizing medium, and mechanism in the circuit responsive to changes in pressure in the system for reversing the direction of flow of the pressure equalizing medium through the evaporator.

11. An absorption refrigeration system of a type employing auxiliary pressure equalizing fluid and having a circuit for auxiliary fluid including an evaporator, a refrigerant liquefier connected to deliver liquid refrigerant to said evaporator, said cricuit providing alternative paths of flow each including said evaporator and so arranged that when one of said paths is in use auxiliary fluid flows in one direction through said evaporator and when the other of said paths is in use auxiliary fluid flows in another direction through said evaporator, and structure operative upon change in a condition affecting operation of the system to select the use of one or the other of said paths and thereby control the direction of flow of auxiliary fluid in said evaporator.

12. In an absorption refrigeration system comprising a plurality of elements including an evaporator, conduits connecting the elements to provide a closed circuit for the circulation of a refrigerant and absorbent and provide separate paths of flow for an auxiliary pressure equalizing medium, one of said paths of flow causing the pressure equalizing medium to flow in one direction through the evaporator and the other path causing the medium to flow in the opposite direction through the evaporator, and valves in the conduits for selecting the path and direction of flow of the pressure equalizing medium through the evaporator.

13. In an absorption refrigeration system comprising a plurality of elements including an evaporator, conduits connecting the elements to provide a closed circuit for the circulation of a refrigerant and absorbent and provide separate paths of flow for an auxiliary pressure equalizing medium, one of said paths causing the pressure equalizing medium to flow in one direction through the evaporator and the other path causing the medium to flow in the opposite direction through the evaporator, valves in the conduits for selecting the path and direction of flow of the pressure equalizing medium through the evaporator, and means responsive to changes in the temperature of the ambient air for operating the valves to close one path of flow and open the other path of flow.

14. In an absorption refrigeration system comprising a plurality of elements including an evaporator, conduits interconnecting the elements to provide a closed circuit for the circulation of a refrigerant and absorbent and provide separate paths of flow for an auxiliary pressure equalizing medium, one of said paths causing the pressure equalizing medium to flow through the evaporator in a direction concurrent with the refrigerant and the other paths causing the medium to flow through the evaporator in a direction countercurrent to the refrigerant, and valves in the conduits for selecting the path and direction of flow of the pressure equalizing medium through the evaporator.

15. In an absorption refrigeration system comprising a plurality of elements including an evaporator, conduits interconnecting the elements to provide a closed circuit for the circulation of a refrigerant and absorbent and provide separate paths of flow for an auxiliary pressure equalizing medium, one of said paths directing the pressure equalizing medium through the evaporator for flow concurrent with the refrigerant and the other path directing the medium through the evaporator for flow countercurrent to the refrigerant, valves in the conduits for selecting the path and direction of flow of the pressure equalizing medium through the evaporator, and means operative upon a change in a condition affecting operation of the system for operating the valves to close one path of flow and open the other path of flow.

16. In an absorption refrigeration system comprising a plurality of elements including an evaporator and an absorber, conduits interconnecting the elements to provide a closed circuit for the circulation of a refrigerant and absorbent, said connecting conduits providing a single path of flow for a pressure equalizing medium through the absorber and separate paths of flow to the evaporator, one of the paths causing the pressure equalizing medium to flow through the evaporator in one direction and the other path causing the medium to flow through the evaporator in the opposite direction, and valves operative upon change in a condition affecting operation of the system to close one of said paths and open the other of said paths and thereby control the direction of flow of the pressure equalizing medium in said evaporator.

17. In an absorption refrigeration system comprising a plurality of elements including an evaporator and an absorber, conduits interconnecting the elements to provide a closed circuit for the circulation of a refrigerant and absorbent, said connecting conduits including main conduits leading to and from the absorber to provide a single path of flow through the absorber, branch conduits connecting the main conduits to provide separate paths of flow to the evaporator, one of said paths causing an auxiliary pressure equalizing medium to flow in one direction through the evaporator and the other path causing the medium to flow in the opposite direction through the evaporator, valves in the conduits, and a hydraulic circuit responsive to variations in pressure in the system for operating the valves to select the use of one or the other of said paths and thereby control the direction of flow in said evaporator.

18. In an absorption refrigeration system comprising a generator, a condenser, an evaporator, an absorber, a pressure vessel, conduits interconnecting the elements to provide a closed circuit for the circulation of a refrigerant and absorbent and provide separate paths of flow for an auxiliary pressure equalizing gas medium to the evaporator, one of said paths of flow causing the auxiliary pressure equalizing medium to flow in one direction through the evaporator and the other path of flow causing the medium to flow in the opposite direction through the evaporator, said connecting conduit between the pressure vessel and evaporator providing a liquid trap to produce a pressure differential in the system upon an increase in the temperature of the ambient air, and mechanism responsive to the pressure differential for selecting the path and the direction of flow of the auxiliary pressure equalizing medium through the evaporator.

19. In an absorption refrigeration system comprising a generator, a condenser, an evaporator, an absorber, a pressure vessel, conduits interconnecting the elements to provide a closed circuit for the circulation of a refrigerant and an absorbent and provide separate paths of flow for an auxiliary pressure equalizing medium to the evaporator, one of said paths causing the pressure equalizing medium to flow through the evaporator in a direction concurrent with the refrigerant and the other path of flow causing the medium to flow through the evaporator countercurrent to the refrigerant, a liquid trap in the conduit connecting the pressure vessel and evaporator for producing a pressure differential in the system upon an increase in the temperature of the ambient air, and valves operated by the pressure differential for selecting the path and direction of flow for the pressure equalizing medium through the evaporator.

20. In an absorption refrigeration system comprising a generator, a condenser, an evaporator, an absorber, a pressure vessel, conduits interconnecting the elements to provide a closed circuit for the circulation of a refrigerant and an absorbent and provide separate paths of flow for an auxiliary pressure equalizing medium to the evaporator, one of said paths causing the pressure equalizing medium to flow through the evaporator in a direction concurrent with the refrigerant and the other path of flow causing the medium to flow through the evaporator in a direction countercurrent to the refrigerant, a liquid trap in the conduit connecting the pressure vessel and evaporator for producing a pressure differential in the system upon an increase in the temperature of the ambient air, valves for selecting the path and direction of flow of the pressure equalizing medium through the evaporator, and a hydraulic circuit responsive to variations in the pressure differential in the system for operating the valves.

21. The method of controlling the operation of an absorption refrigeration system having a cooling element and utilizing a refrigerant, absorbent and an auxiliary pressure equalizing medium which comprises separating refrigerant vapor from an absorbent, condensing the refrigerant at one place in the system by transferring heat to the ambient air, flowing condensed liquid refrigerant through the cooling element, flowing the auxiliary pressure equalizing medium through the cooling element to cause the refrigerant to vaporize at a relatively low temperature, flowing absorption solution to absorb the refrigerant vapor, condensing refrigerant vapor at another place in the system upon an increase in temperature of the ambient air, producing a liquid colunm from the condensate formed at the second place, completely separating different gas spaces in the system and establishing a pressure differential therebetween due to such liquid column, and changing the path of flow of one of the fluids in the system due to such pressure differential.

22. The method of controlling an absorption refrigeration system having a cooling element and utilizing a refrigerant, absorbent and an auxiliary pressure equalizing medium which comprises separating refrigerant vapor from an absorbent, condensing the refrigerant at one place in the system by transferring heat to the ambient air, flowing condensed liquid refrigerant through the cooling element, flowing the auxiliary pressure equalizing medium through the cooling element to cause the refrigerant to vaporize at a relatively low temperature, flowing absorption solution to absorb refrigerant vapor, condensing the refrigerant vapor at another place in the system upon an increase in temperature of the ambient air, producing a liquid column from the condensate formed at the second place, completely separating different gas spaces in the system and establishing a pressure differential therebetween due to such liquid column, and changing the path of flow of the pressure equalizing medium in the system due to such pressure differential.

23. In the art of refrigeration with the aid of a system having a number of parts including an evaporator, an absorber and a generator interconnected for circulation of refrigerant and absorption solution and employing an inert gas for maintaining the same total pressure in such parts during normal operation of the system, the improvement which comprises collecting condensate, forming a liquid column of collected condensate, completely separating the gas spaces of different parts and establishing a pressure differential therebetween due to the forming of such liquid column, and modifying the behavior of a fluid in the system due to such pressure differential.

24. In the art of refrigeration as set forth in claim 23, in which the behavior of a gaseous fluid circulating in the system is modified due to the pressure differential established between completely separated gas spaces of different parts.

25. In the art of refrigeration with the aid of a system having a number of parts including an evaporator, an absorber and a generator interconnected for circulation of refrigerant and absorption solution and employing an inert gas for maintaining the same total pressure in such parts during normal operation of the system, the inert gas circulating in a circuit including the evaporator and the absorber, the improvement which comprises collecting condensate, forming a liquid column of collected condensate, completely separating the gas spaces of different parts and establishing a pressure differential therebetween due to the forming of such liquid column, and modifying the behavior of the inert gas circulating in its circuit due to such pressure differential.

26. In the art of refrigeration as set forth in claim 25, in which the circulation of inert gas in its circuit is reduced due to said pressure differential.

27. In the art of refrigeration as set forth in claim 25, in which the direction of flow of the inert gas through the evaporator is reversed due to said pressure differential.

28. In the art of refrigeration as set forth in claim 25, in which the direction of the flow of the inert gas through the evaporator is changed due to such pressure differential without changing the direction of flow of the inert gas through the absorber.

29. In the art of refrigeration with the aid of a system having a number of parts including an evaporator, an absorber and a generator interconnected for circulation of refrigerant and absorption solution and employing an inert gas for maintaining the same total pressure in such parts during normal operation of the system, the improvement which comprises collecting refrigerant fluid in liquid phase upon increase in load, forming a liquid column of the collected refrigerant, completely separating the gas spaces of different parts and establishing a pressure variation therebetween due to the forming of such liquid column, and modifying the behavior of a fluid in the system due to such pressure variation.

30. A refrigeration system containing an inert gas comprising a plurality of parts including a generator, an evaporator and an absorber interconnected for circulation of refrigerant and absorption liquid, the inert gas maintaining the same total pressure in the system and the gas spaces of different parts being in open communication with each other during normal operation of the system, means providing a place for accumulating liquid upon increase in load, and structure to completely separate the gas spaces of said different parts responsive to said accumulation of liquid for changing the level of liquid in the system, said structure including means to modify the behavior of a fluid in the system responsive to such change in level of liquid.

31. A refrigeration system as set forth in claim 30, in which said means for accumulating liquid includes a pressure vessel in which refrigerant vapor is liquefied upon increase in load.

SIGURD MATTIAS BÄCKSTRÖM.

(References on following page)

REFERENCES CITED

The following references are of record in the file of this patent:

UNITED STATES PATENTS

| Number | Name | Date |
|---|---|---|
| 1,846,626 | Altenkirch | Feb. 23, 1932 |
| 1,925,361 | Altenkirch | Sept. 5, 1933 |
| 1,930,671 | Altenkirch | Oct. 17 1933 |
| 1,976,202 | Thomas | Oct. 9, 1934 |
| 2,035,499 | Nelson | Mar. 31, 1936 |
| 2,178,603 | Nelson | Nov. 7, 1939 |
| 2,181,528 | Widell | Nov. 28, 1939 |
| 2,252,791 | Ullstrand | Aug. 19, 1941 |
| 2,282,684 | Taylor | May 12, 1942 |
| 2,306,199 | Ullstrand | Dec. 22, 1942 |